United States Patent Office 3,386,870
Patented June 4, 1968

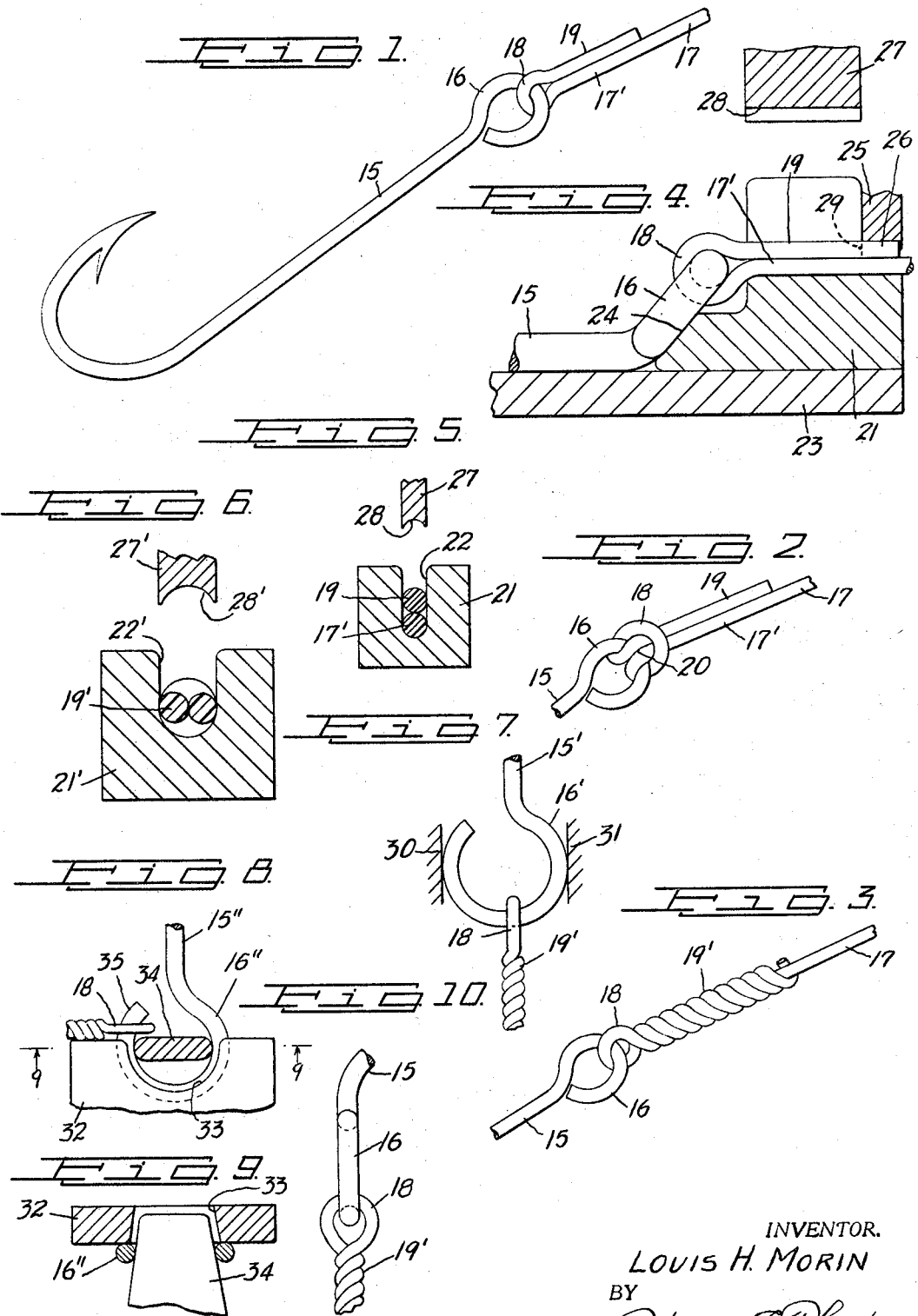

3,386,870
METHOD OF ULTRASONIC BONDING OF OVERLYING PORTIONS OF A FISHHOOK SNELL
Louis H. Morin, Bronx, N.Y., assignor of one-fourth to Madeline F. McGill, Denver, Colo., and one-fourth to J. R. Hanna, Bronxville, N.Y.
Filed July 2, 1965, Ser. No. 469,221
4 Claims. (Cl. 156—73)

ABSTRACT OF THE DISCLOSURE

A method of supporting a tail end of a nylon snell upon a body part of the snell adjacent a loop in the snell and then applying supersonic vibration blows upon the tail end and body part while confined in an anvil in producing a weld between engaged surfaces of said tail end and body part.

---

This invention relates to fishhooks having snells as an integral part thereof as sold commercially. More particularly, the invention deals with a hook of this kind, wherein a short tail part of the snell extending from the eye of the hook is arranged upon the snell adjacent the hook and secured thereto by welding in positively retaining the snell against displacement from the hook. Still more particularly, the invention deals in a method of producing snelled fishhooks of the type and kind under consideration.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic view of a fishhook showing one end portion of a snell attached thereto according to my invention, the size of the snell being enlarged for sake of clarity.

FIG. 2 is a view, similar to FIG. 1, showing only a part of the construction and illustrating a different manner of attachment of the snell to the eye of the fishhook.

FIG. 3 is a view, similar to FIG. 2, showing a different method of arranging the tail portion of the snell upon the end portion of the snell adjacent the eye of the fishhook.

FIG. 4 is a diagrammatic view illustrating the method of welding the tail end of the snell to the adjacent part of the snell of the fishhook, the punch or horn of the mechanism being shown in open position.

FIG. 5 is a diagrammatic cross-sectional view showing the relationship of the tools, preparatory to forming a weld.

FIG. 6 is a view, similar to FIG. 5, diagrammatically illustrating the welding of a twisted tail portion of the snell as shown, for example, in FIG. 3 of the drawing.

FIG. 7 is a diagrammatic view of an open fishhook eye, indicating the attachment of a welded snell thereto and diagrammatically showing the tools for closing the open eye.

FIG. 8 is a diagrammatic view showing the method of opening a fish hook eye for attachment of a snell therewith, one of the tools for opening the eye being shown in section.

FIG. 9 is a section on the line 9—9 of FIG. 8, with the spreading wedge tool shown in elevation; and FIG. 10 is an edge view of the eye end of a fishhook, showing part of a snell attached thereto.

My invention deals with the formation of a snelled fishhook, wherein an end portion of the snell is passed through the eye of a fishhook and the short end or tail of the snell is secured in position by welding to simplify and economize on the production of assemblages of this type and kind. Still more particularly, the invention deals with a method of producing snelled fishhooks, wherein the welding operation is accomplished by subjecting overlying portions of the snell adjacent the eye to vibrations at very high speeds, for example, at eighteen thousand cycles per second or greater with an ultrasonic or supersonic instrument. United States Patents Nos. 3,022,841 and 3,184,354 are examples of instruments or machines of this general type and kind.

With this method of procedure, heat is built up in the overlying parts of the snell which establishes the weld and, upon completion of the vibratory operations, the snell will quickly cool, producing the desired end result in a simple and economical manner.

In carrying out my method, the overlying portions of of the snell are arranged and held within the confines of a channelled anvil as the punch or horn of the instrument vibrates toward and from the overlying portions of the snell within the anvil, suitable adjustment being provided to control the action of the punch or horn on the overlying parts of the snell. The punch or horn will have a width conforming to the width of the channel of the anvil and of a length consistent with the major part of the length of the overlapped portions of the snell adjacent the eye of a fishhook or a suitable support for the looped portion of the snell as and when the snell is welded, prior to attachment to the eye of a fishhook in accordance with the method defined. While other methods of accomplishing this welding operation could be utilized, the method above defined is doubtlessly the simplest and most economical in producing the desired end result.

Considering FIG. 1 of the drawing, at 15 is shown a more or less conventional fishhook having an eye end 16, with which is connected a long monofilament or snell 17 of thermoplastic material such, for example, as nylon. The snell is passed through the eye 16 and forms in this engagement a loop 18, from which extends a short end or tail 19 arranged directly upon an adjacent body portion 17' of the snell, as diagrammatically shown.

In FIG. 2 of the drawing is shown part of a fishhook 15, having an eye 16, similar to the showing in FIG. 1 and, with this construction, a modified attachment of the snell to the eye 16 is illustrated. In other words, the snell 17, as well as the end 19, includes portions passing through the loop 18 formed in the snell, as diagrammatically seen at 20, in forming a preattachment of the snell to the eye of the fishhook. Otherwise, the structure and method of procedure will be the same in FIG. 2 as in FIG. 1 of the drawing. In FIG. 3 of the drawing, I have shown a part of the fishhook at 15, the eye at 16 and, in this figure, the snell end or tail 19' is twisted with a body portion of the snell 17 where it extends from the loop 18. An assemblage of this type and kind will require a different form of tooling than that employed in the welding of the structures as shown in FIGS. 1 and 2 of the drawing, as will be later described.

Considering FIG. 4 of the drawing, here is diagrammatically shown an anvil 21, having an upwardly extending confining channel 22, note FIG. 5, the anvil being arranged upon and suitably secured to a support or bedplate 23. The anvil also has a workpiece supporting surface 24 for positioning the usually offset eye end 16 of a fishhook 15, in the manner diagrammatically shown, so as to properly position the eye with respect to the loop 18, consistent with the arrangement of the end or tail 19 of the snell and the portion 17' of the snell, as diagrammatically shown.

For retaining the end 19 in position upon the portion 17' of the snell, a suitable holding tool 25 is employed engaging a projecting end 26 of the tail 19 during the vibratory operations of the punch or horn 27.

Considering FIG. 5 of the drawing, it will appear that the width of the punch or horn 27 is substantially the same as the width of the channel 22 in the anvil 21. The punch or horn has a recessed lower surface 28, generally conforming to the contour of the upper portion of the tail 19 as supported within the confining channel 22. This will be clearly apparent from a consideration of FIG. 5 of the drawing. As and when the welding operation has been performed and with the tool 25 in a raised position, the end 26 can be removed, if desired, by a suitable cutting tool or tools, not shown, along the dotted line 29, FIG. 4 of the drawing.

Considering FIG. 6 of the drawing, a slightly modified form of anvil 21' is employed, wherein the channel 22' is made sufficiently wide to receive the twisted portion 19' of the snell and, here, the punch or horn 27' will be made to conform with the width of the channel 22' and the recessed surface 28' made to conform with the general contour of the twist 19', as diagrammatically seen in FIG. 6 of the drawing.

With various types of fishhooks, other methods of procedure can be followed in producing the desired end result and particularly when the welding operation upon the snell has been pre-formed and the snell then attached to the eye of the fishhook. Considering FIG. 7 of the drawing, 15' illustrates the eye end of a modified form of hook, wherein the eye 16' is prefabricated in an open position, facilitating the attachment of the loop end 18 of a pre-formed snell of the type shown in FIG. 3, by way of illustration, in other words, incorporating the twist 19'. After the snell has been attached to the open eye 16', the eye is then closed by movement of suitable tools 30, 31 toward each other.

With other forms of construction, in other words, wherein the fishhook 15" including its eye 16" are hardened and tempered, attachment similar to that shown in FIG. 7 can be made, as diagrammatically shown in FIG. 8, by positioning the normally closed eye 16" on the surface of a backup tool 32, having a conical aperture 33 therein and then forcing a tapered thin wedge 34 through the eye to move the end portion 35 of the eye into an open position sufficiently to pass the loop 18 of the pre-formed snell over the open end 35; whereupon, the wedge 34 is withdrawn and the eye automatically returns to its closed position, as will be apparent.

In FIG. 10 is shown an edge view of the eye end 16 of a fishhook 15 to show the offset appearance of the eye with a snell assemblage, similar to that shown in FIG. 3, depending therefrom.

In the welding of the overlying portions of the snell, it will be apparent that the weld will take place between engaged surfaces of the snell. In some instances, slight depressions will take place between these engaged surfaces by virtue of the vibratory action of the punch or horn, but no attempt has been made to show such formations.

From the foregoing, it will be apparent that the resulting snelled fishhook can be simply and economically produced and the desired streamlining of the snell with respect to the eye end of the fishhook obtained, greatly facilitating the use of the fishhook while, at the same time, assuring a positive coupling of the snell with the fishhook.

Having fully described my invention, what I claim as new and desire to secure by Letters Patent is:

1. A method of producing snelled fishhooks which consists in supporting a tail end of a nylon snell upon a body portion of the snell adjacent a loop formed in the snell, supporting the tail end and body portion of the snell in a channel confining portion of an anvil, then applying high speed supersonic vibration blows upon the assemblage of the tail and body portion of the snell confined in the anvil, and forming by said blows a weld between engaged surfaces of the tail with said body portion of the snell in fixedly uniting the tail to the body portion of the snell.

2. A method as defined in claim 1, wherein an eye of a fishhook is supported in the loop of the snell during the weld attachment of the tail to the body portion of the snell.

3. A method as defined in claim 1, wherein the confining portion of the anvil supports the tail in a twisted relationship to the body portion of the snell in establishing a weld between said engaged surfaces of the tail and the body portion of the snell.

4. A method as defined in claim 1, wherein an eye of a fishhook is opened for attachment of the loop of the snell with the eye, preparatory to closing of the eye in attachment of the snell to the fishhook.

References Cited

UNITED STATES PATENTS

| | | | |
|---|---|---|---|
| 2,985,954 | 5/1961 | Jones et al. | 228—1 |
| 3,301,931 | 1/1967 | Morin | 264—161 XR |
| 3,287,483 | 11/1966 | Morin | 264—161 |
| 2,732,652 | 1/1956 | Parks | 43—44.83 |
| 2,636,307 | 4/1953 | Mason et al. | 43—44.83 |
| 3,184,354 | 5/1965 | Strother | 156—73 |

EARL M. BERGERT, *Primary Examiner.*

PHILIP DIER, *Examiner.*